United States Patent [19]
Goetz et al.

[11] 3,713,742
[45] Jan. 30, 1973

[54] SCENE AUTO-CORRELATOR

[75] Inventors: Allan C. Goetz; Roger S. Cortesi, both of Washington, D.C.; Lester A. Hauck, Elicott City, Md.

[73] Assignee: Westinghouse Electric Corporation, Pittsburgh, Pa.

[22] Filed: Oct. 20, 1970

[21] Appl. No.: 82,445

[52] U.S. Cl. ................................................356/206
[51] Int. Cl. ..............................................G01n 21/22
[58] Field of Search .....................356/201–206, 71, 356/156, 166; 340/146.3 Q

[56] References Cited

UNITED STATES PATENTS

| 3,288,018 | 11/1966 | Belchis et al. | 356/2 X |
| 3,582,664 | 6/1971 | Hrdina | 356/206 X |
| 1,135,919 | 4/1915 | Pilkington | 356/166 X |
| 1,775,794 | 9/1930 | White | 356/71 |
| 2,320,338 | 6/1943 | Bryce | 356/71 X |
| 2,795,705 | 6/1957 | Rabinow | 356/71 X |
| 2,950,799 | 8/1960 | Timms | 356/71 X |
| 3,380,240 | 6/1968 | Robbins | 324/77 K |
| 3,467,829 | 9/1969 | Wilmotte | 340/146.3 Q |
| 3,501,238 | 3/1970 | Stetson et al. | 356/71 |
| 3,520,624 | 7/1970 | Johnson et al. | 356/206 X |

Primary Examiner—Ronald L. Wibert
Assistant Examiner—J. Rothenberg
Attorney—F. H. Henson, E. P. Klipfel and S. Weinberg

[57] ABSTRACT

An apparatus which evaluates the auto-correlation function of two films. A beam of light is directed from a source of light through the two films. The same source of light provides a reference light beam. A volt meter compares the intensity of the light filtering through the two films with the reference beam.

9 Claims, 1 Drawing Figure

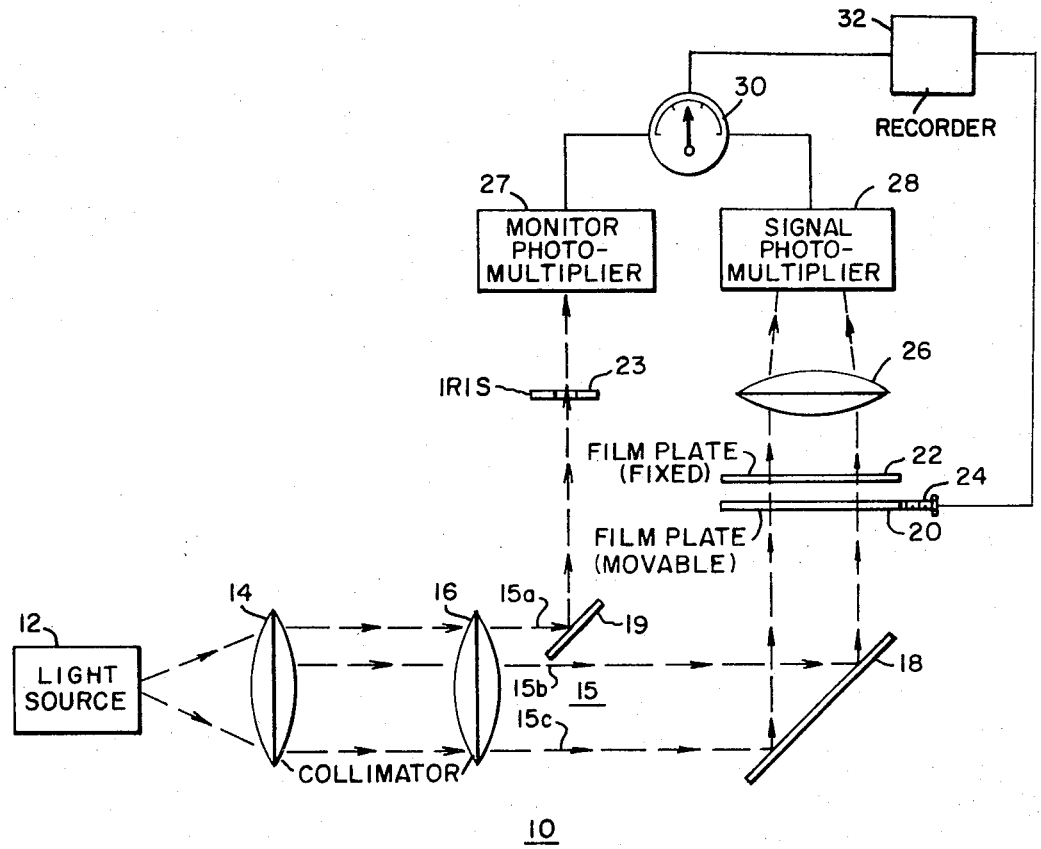

SCENE AUTO-CORRELATOR

BACKGROUND OF THE INVENTION

1. Field of the Invention

The invention pertains, in general, to optical systems and, specifically, to those optical systems which can evaluate the auto-correlation function of two films.

2. Description of the Prior Art

In the past, auto-correlation has been used for a number of different reasons and has been performed in a number of different ways. One purpose for performing auto-correlation of two images, as described in Fomenko U.S. Pat. No. 3,153,222, is to determined displacement of information in one record with respect to information upon another. In the above cited patent, a thin beam of light is moved about in front of two masks which contain identical information. As the beam of light is moved around, the intensity of the light filtering through the two masks is measured. The light filtering through the masks will be at a maximum only when the moving light beam finds a correlation point.

Another purpose of auto-correlation is shown in a U.S. Pat. to Belchis et al., No. 3,288,018. The purpose of this apparatus is to place two transparencies into registry. By using two motors for movement in vertical and horizontal directions, it is able to place two transparencies into registry by noting the point of maximum intensity of a correlation spot.

The U.S. Pat. to Russell et al., No. 3,361,029, is a patent in an analogous art area and is cited here as of interest. The purpose of Russell et al is to scan a film to detect the presence of nuclear particle tracks on the film. A source of light illuminates the film and sends the light coming through the film through two different photomultipliers. The light coming through one photomultiplier is used as a reference. The magnitude of the reference can be adjusted by a resistor. The outputs of both photomultipliers are directed to a differential amplifier. When a particle track is scanned on the film, the differential amplifier indicates a peak output.

BRIEF SUMMARY OF THE INVENTION

Broadly, speaking the present device can be used to measure relative movement between at least two films. More specifically, it can be used to evaluate the auto-correlation function between the films as they are moved relative to one another. The auto-correlation is evaluated by measuring the changes of the intensity of light which the films permit to be transmitted by using a reference means in the form of a second beam of light as a base of comparison for the light which is transmitted through the films.

BRIEF DESCRIPTION OF DRAWING

For a better understanding of the invention, reference may be had to the preferred embodiment, exemplary of the invention, shown in the accompanying drawing, in which:

The single FIGURE shows a diagram of how the various elements of the invention are interrelated.

DETAILED DESCRIPTION OF THE INVENTION

Auto-correlation has been well defined in the literature. Typical of the literature definitions is the one found in U.S. Pat. No. 3,388,240, to M. A. Robbins, which is hereby incorporated by reference. Particular attention is directed to the following specific portions of the Robbins patent: column 2, lines 64 to 73 and column 3, lines 1 to 32.

The device described here is an apparatus which evaluates the auto-correlation function of two films. Light transmitted through the two films is effected either by relative translational movement between the films or by relative rotational movement between them. Movement in either manner will cause a variation in the auto-correlation function. The invention measures the auto-correlation function between two films by means of a scheme of differential measurement of light intensity employing photomultipliers. This apparatus for light intensity measurement allows the accurate evaluation of auto-correlation for confused scenes.

The device 10 includes a light source 12. The light source 12 is preferably a source of very concentrated light so that it appears to be a point of light. The light emanating from such sources are more easily collimated than the light from other sources. An example of such a source of light is a mercury discharge lamp. The rays of light coming from light source 12 are collimated by lenses 14 and 16 into a single optical path which is located between the outer edges of lenses 14 and 16. Light rays 15a, 15b, and 15c have been shown as typical of the rays which are present in the single optical path 15.

A portion of the rays in single optical path 15 are directed through two film plates 20 and 22 by plane mirror 18. Typical of the rays which are directed through the film plates are light rays 15b and 15c. Each of the film plates 20 and 22 contains a film. Each of the films contain identical information. The relationship of plate 20 to plate 22 and the relationship of both of them to the overall system 10 is only shown schematically. The particular structure used to hold film plates 20 and 22 does not form a part of the present invention.

However, in order to evaluate the auto-correlation function, film plate 22 must be placed in a fixed position so that it cannot be moved. Film plate 20, however, is mounted on a movable stage which is capable of moving in two directions of translation. Film plate 20 is also capable of rotational movement in a plane which is parallel to film plate 22. Translational and rotational movement of film plate 20 with respect to film plate 22 is necessary in order to evaluate the auto-correlation function of the information contained on the films which are mounted in the film plates. The movement of film plate 20 relative to film plate 22 is controlled by any suitable means. Such a means might be a screw such as indicated by 24.

The total light intensity which passes through film plates 20 and 22 is directed by a condensing lens 26 to a photomultiplier 28. Photomultiplier 28 converts the light energy incident upon it to electrical energy and connects the resultant electrical energy to one side of a null meter 30.

Another portion of the light in the single optical path 15 is directed to a second optical path by a second plane mirror 19. Typical of the light being directed into the second optical path is the light ray 15a. Mirror 19 directs the light in this path through a variable iris 23 to a second photomultiplier 27. The electrical output of photomultiplier 27 is connected to the opposite side of null meter 30. As a result, the light in the second optical path provides a reference beam of light which is used as a base of comparison for the light in the first optical path which has passed through the film plates 20 and 22.

It is not the purpose of null meter 30 to measure the absolute values of current or voltage which are flowing out of photomultiplier 27 or photomultiplier 28. It is, however, the purpose of null meter 30 to measure the relative magnitudes of these parameters. Therefore, null meter 30 can be a very sensitive meter.

In operation, the iris 23 is first closed so that no light is available for the reference beam. Movable film plate 20 is then moved in the required manner so as to place it in registry with film plate 22. The point of registry can be determined when null meter 30 is at its maximum indication. Iris 23 is then opened a sufficient amount so that the light in the second optical path exactly balances and is equal to the light in the first optical path. Such a balance results in a null being indicated on meter 30.

As film plate 20 is moved in a translational or a rotational manner with respect to film plate 22, the intensity of the light transmitted through the two plates will necessarily decrease because the film plates were initially in registry thereby allowing maximum light intensity to pass through them. Depending upon the detail of the information contained on each plate, and the intensity changes across each film, the intensity of the transmitted light will increase or decrease as film plate 20 is moved relative to film plate 22. As the plates are moved relative to one another, the values shown on the null meter 30 can be plotted to form a graph such as by graphic recorder 32. If desired, the graph can later be used to determine the distance one film was moved relative to the other film. Of course, the graph would be a plot of voltage versus distance. A separate plot would be made for translational movement and a separate plot would be made for rotational movement. By using the teachings of this invention, movements of 0.001 inches and rotations of 5 minutes of arc between the two films can be easily determined. Therefore, a very accurate and detailed graph can be plotted.

Accordingly, this invention teaches a very high sensitivity apparatus for evaluating the auto-correlation function between two films. Once the auto-correlation function has been evaluated, the data can be used at a later point in time to determine relative movement between the same two films.

We claim as our invention:

1. Apparatus for measuring relative movement between at least two adjacent films which are transmissive to light, the combined transmissivity of said films being variable in response to said relative movement, comprising:
    a source of light for illuminating said films,
    means for moving said films relative to one another,
    means for measuring the intensity of the light transmitted by said films, said measuring means including a reference means for providing a light intensity base level of comparison for said transmitted light,
    and means for indicating changes in the measured intensity of the light transmitted by said films as a function of said relative movement of said films.

2. The apparatus of claim 1 including a first optical means for directing light from said source through said films and wherein said reference mans includes a second optical means for directing light to a second light intensity measuring means.

3. The apparatus of claim 2 wherein said second optical means directs light from said source of light to said second light intensity measuring means.

4. The apparatus of claim 2 wherein said first optical means is disposed between said source of light and said films, wherein said first optical means directs light from said source into a first optical path and said second optical means directs light into a second optical path and wherein said apparatus includes means for controlling the intensity of the light in at least one of said paths.

5. Apparatus for measuring relative movement between at least two adjacent films which are transmissive to light, the combined transmissivity of said films being variable in response to said relative movement, comprising:
    a source of light for illuminating said films,
    means for moving said films relative one to the other,
    means for directing light from said source into a single optical path,
    optical means disposed in said single optical path for dividing the light in said single optical path into first and second optical paths, said films intersecting only said first optical path, means for measuring the intensity of the light transmitted by said films relative to a light intensity base level, reference means for utilizing the light in said second optical path to provide said base level,
    and means for relating the measured intensity of the light transmitted by said films with said relative movement of said films.

6. The apparatus of claim 5 wherein the reference means includes means for utilizing the light intensity in said second optical path to provide a reference level for measuring the light intensity in said first optical path.

7. The apparatus of claim 5 wherein said optical means includes first and second optical means, said first optical means directing light to said first optical path to illuminate said films and said second optical means directing light to said second optical path to provide an intensity reference level for the light in said first optical path.

8. The apparatus of claim 7 including means for comparing the intensity of the light transmitted by said films with the intensity of said light in said second optical path.

9. The apparatus of claim 8 wherein said comparing means includes a meter.

* * * * *